(12) United States Patent
Leman

(10) Patent No.: US 6,359,774 B1
(45) Date of Patent: Mar. 19, 2002

(54) HINGE ASSEMBLY FOR A PORTABLE COMPUTER

(75) Inventor: Michael V. Leman, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/758,672

(22) Filed: Jan. 11, 2001

Related U.S. Application Data

(63) Continuation of application No. 09/324,398, filed on Jun. 3, 1999.

(51) Int. Cl.⁷ .............................. H05K 7/10; H05K 7/16
(52) U.S. Cl. ....................... 361/681; 361/683; 361/686; 16/221
(58) Field of Search .................................. 361/681, 683, 361/682, 680, 686; 16/221, 252, 342, 337, 303, 319, 332, 336

(56) References Cited

U.S. PATENT DOCUMENTS

| | | | |
|---|---|---|---|
| 4,730,364 A | 3/1988 | Tat-Kee .................... 16/337 |
| 4,825,395 A | 4/1989 | Kinser, Jr. et al. ......... 364/708 |
| 4,878,293 A | 11/1989 | Kinser, Jr. et al. ......... 29/850 |
| 4,976,007 A | 12/1990 | Lam ......................... 16/302 |
| 5,028,913 A | 7/1991 | Kitamura .................. 340/711 |
| 5,043,846 A | 8/1991 | Kinoshita ................. 361/394 |
| 5,052,078 A | 10/1991 | Hosoi ...................... 16/297 |
| 5,077,551 A | 12/1991 | Saitou ..................... 340/700 |
| 5,081,742 A | 1/1992 | Kobayashi ................ 16/337 |
| 5,103,377 A | 4/1992 | Kobayashi et al. ........ 361/394 |
| 5,142,738 A | 9/1992 | Ojima ...................... 16/306 |
| 5,144,290 A | 9/1992 | Honda et al. ............. 340/711 |
| 5,233,502 A | 8/1993 | Beatty et al. ............. 361/729 |
| 5,235,356 A | 8/1993 | Israel ...................... 351/153 |
| 5,237,488 A | 8/1993 | Moser et al. .............. 361/729 |
| 5,239,731 A | 8/1993 | Lu .......................... 16/340 |
| 5,283,862 A | 2/1994 | Lund ....................... 395/155 |
| 5,367,346 A | 11/1994 | Branning .................. 351/153 |
| 5,455,987 A | 10/1995 | Svehaug ................... 16/267 |
| 5,498,165 A | 3/1996 | Tseng ...................... 439/31 |
| 5,507,072 A | 4/1996 | Youn ....................... 16/261 |
| 5,566,048 A | 10/1996 | Esterberg et al. ......... 361/681 |
| 5,583,529 A | 12/1996 | Satou ...................... 345/87 |
| 5,590,024 A | 12/1996 | Honda et al. ............. 361/684 |
| 5,594,619 A | 1/1997 | Miyagawa et al. ........ 361/681 |
| 5,632,064 A | 5/1997 | Lautenschlager ......... 16/272 |
| 5,632,066 A | 5/1997 | Huong .................... 16/338 |
| 5,751,544 A | 5/1998 | Song ....................... 361/681 |
| 5,768,098 A | 6/1998 | Murayama ............... 361/684 |
| 5,805,415 A | 9/1998 | Tran et al. ................ 361/681 |
| 5,844,774 A | 12/1998 | Gushiken et al. ......... 361/681 |
| 5,898,567 A | 4/1999 | Satake ..................... 361/687 |

FOREIGN PATENT DOCUMENTS

| | | | |
|---|---|---|---|
| FR | 1312116 | 11/1962 | |
| JP | 407225636 | 8/1995 | ........... G06F/1/18 |
| JP | 409283946 | 10/1997 | ........... H05K/5/03 |

Primary Examiner—Leo P. Picard
Assistant Examiner—Anatoly Vortman
(74) Attorney, Agent, or Firm—Trop, Pruner & Hu, P.C.

(57) ABSTRACT

A portable computer system may include a planar hinge to enable a display unit to be folded down on top of a base unit. The planar hinge may be located near an outside edge of the display unit, accommodating a large display. The display may occupy space near the bottom of the display unit that is ordinarily occupied by a hinge assembly. The base unit may include blade connectors to conduct power and output signals to female connectors on the display unit. Alternatively, the blade connectors may be located on the display unit while the female connectors may be incorporated in the base unit.

17 Claims, 9 Drawing Sheets

HINGE ASSEMBLY FOR A PORTABLE COMPUTER

CROSS-REFERENCE TO RELATED APPLICATION

This is a continuation of U.S. Ser. No. 09/324,398, filed Jun. 3, 1999.

BACKGROUND

The invention relates generally to portable computer systems, and more particularly to hinge assemblies for portable computers.

Computer users generally desire to view the output of a computer on a large display. Thus, one disadvantage of using a portable computer is that the display may have an undesirably small size. To remedy this problem, portable computer manufacturers continually strive to incorporate larger displays in portable computers. A display for a portable computer is typically part of a display unit, a unit that may be designed to fold down to rest on top of a base unit of the computer. For aesthetic purposes, the size of the display unit is generally limited to the dimensions of the base unit. Therefore, portable computer manufacturers attempt to maximize the space available for the display in the display unit. A conventional portable computer may include a hinge assembly that couples the display and base units together. Unfortunately, the hinge assembly may displace a substantial space in the display unit that the display may otherwise occupy.

Thus, it would be beneficial to provide a hinge assembly for a portable computer that consumes less space in the display unit.

SUMMARY

In general, according to one embodiment, a portable computer system comprises a display unit having a display, the display having a first side boundary and a second side boundary. The display unit has a first region outside the first side boundary of the display and a second region outside the second side boundary of the display. The portable computer system also comprises a base unit and a hinge pivotably coupling the display unit to the base unit. The hinge comprises a generally planar member and a slot adapted to receive the generally planar member. The hinge is mounted to a lower portion of the first region, the hinge having a width less than a width of the first region.

In general, according to another embodiment, a portable computer system comprises a display unit having a display, with the display having a side edge. The portable computer system further comprises a base unit and a hinge pivotably coupling the display unit and the base unit. The hinge comprises a gap, a planar member rotatably received in the gap, and a cover for the gap.

In general, in accordance with another embodiment, a portable computer system comprises a display unit having a display, the display having a first side edge and the display unit having a first outer side edge. The portable computer system further comprises a base unit and a hinge pivotably coupling the display unit and the base unit. The hinge is attached to a lower portion of the display unit, and the hinge is positioned entirely within a width defined between the first side edge of the display and the first outer side edge of the display unit.

DETAILED DESCRIPTION

Figure 1:
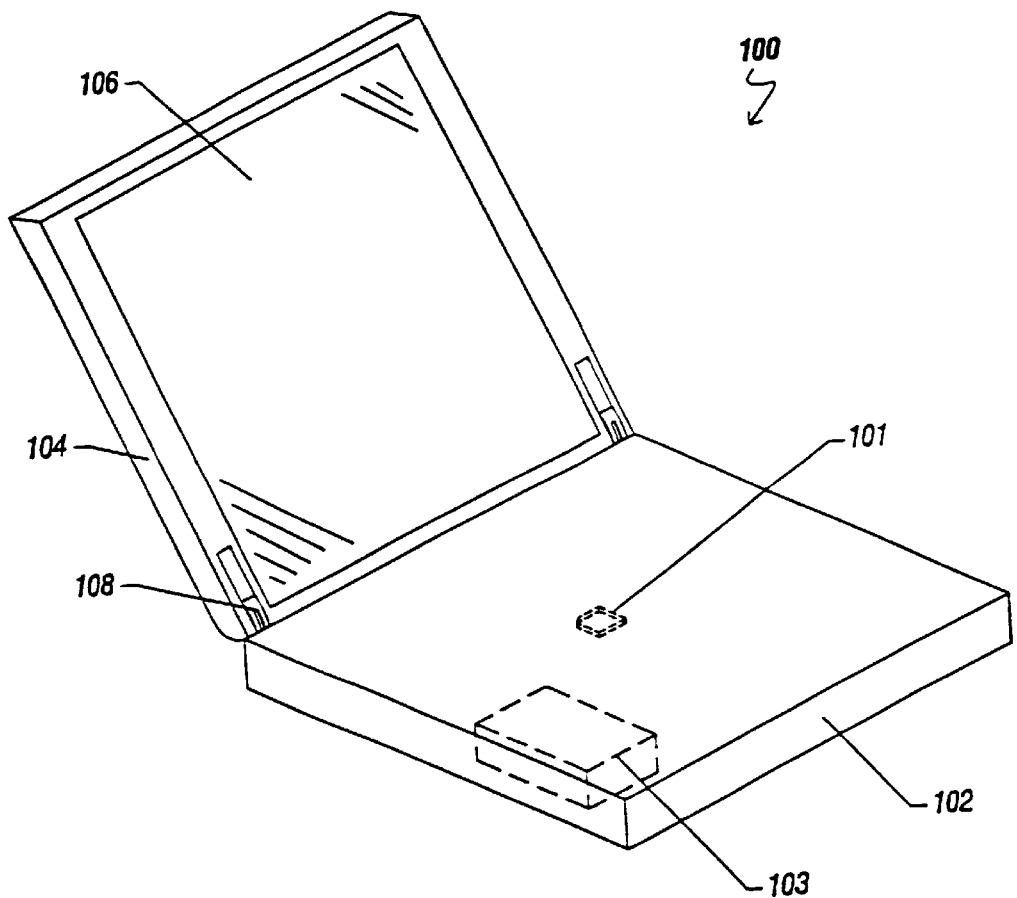
FIG. 1 is a perspective view of a portable computer in accordance with one embodiment of the invention.

Referring to FIG. 1, an illustrative portable computer 100 in accordance with one embodiment of the invention includes a base unit 102 that may include a keyboard, system memory, a mass storage device, a central processing unit 101, and a power source 103. A display unit 104 may be coupled to the base unit 102 by a hinge 108. Additionally, a display 106 may be incorporated in the display unit 104. The display 106 may be any conventional type of computer display including a liquid crystal display (LCD). The central processing unit 101 of the base unit 102 may generate output signals to form images on the display 106, and the power source 103 may provide voltage signals to supply power for the display 106.

Figure 2:
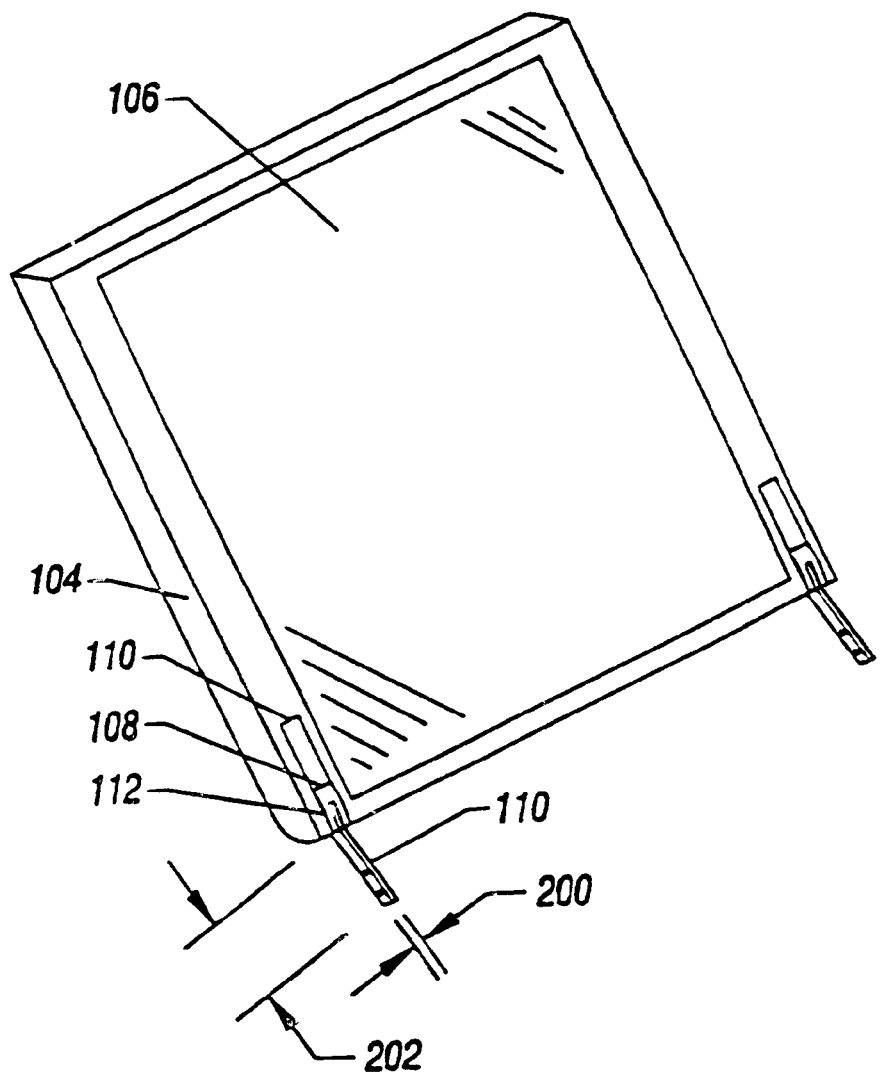
FIG. 2 is a perspective view of the portable computer illustrated in FIG. 1.

Referring to FIG. 2, the hinge 108 is shown in one embodiment as being attached to the display unit 104. The hinge 108 may include two members 110 that rotate about a pivot point 112. The hinge 108 may be a planar hinge such that that the members 110 are confined to rotate in approximately the same plane. In accordance with one embodiment, the members 110 of the planar hinge 108 may be staggered such that the members 110 overlap slightly at the pivot point 112. In another embodiment, the members 110 may converge squarely at the pivot point 112. The display unit 104 may be folded down on top of the base unit 104 by rotating the display unit 104 about the pivot point 112 of the hinge 108. One of the members of the planar hinge 108 may be attached to the display unit 104, and the other member may be attached to the base unit 102. In some embodiments, the width of the members 110 of the planar hinge 108, as shown by arrow 200, may be substantially less than the length of the members 110, as shown by arrow 202. Accordingly, the hinge 108 may be long and thin and may be located to the side of the display 106. For example, the planar hinge 108 may be attached near an outside edge of the display unit 104 as shown in FIG. 2. In another embodiment, a second planar hinge may be attached near a second outside edge of the display unit 104. In yet another embodiment, the planar hinge 108 may be mounted on an outside edge of the display unit 104. The planar hinge 108 may be made of a chrome metal for aesthetic purposes if the hinge 108 is exposed.

Figure 3:
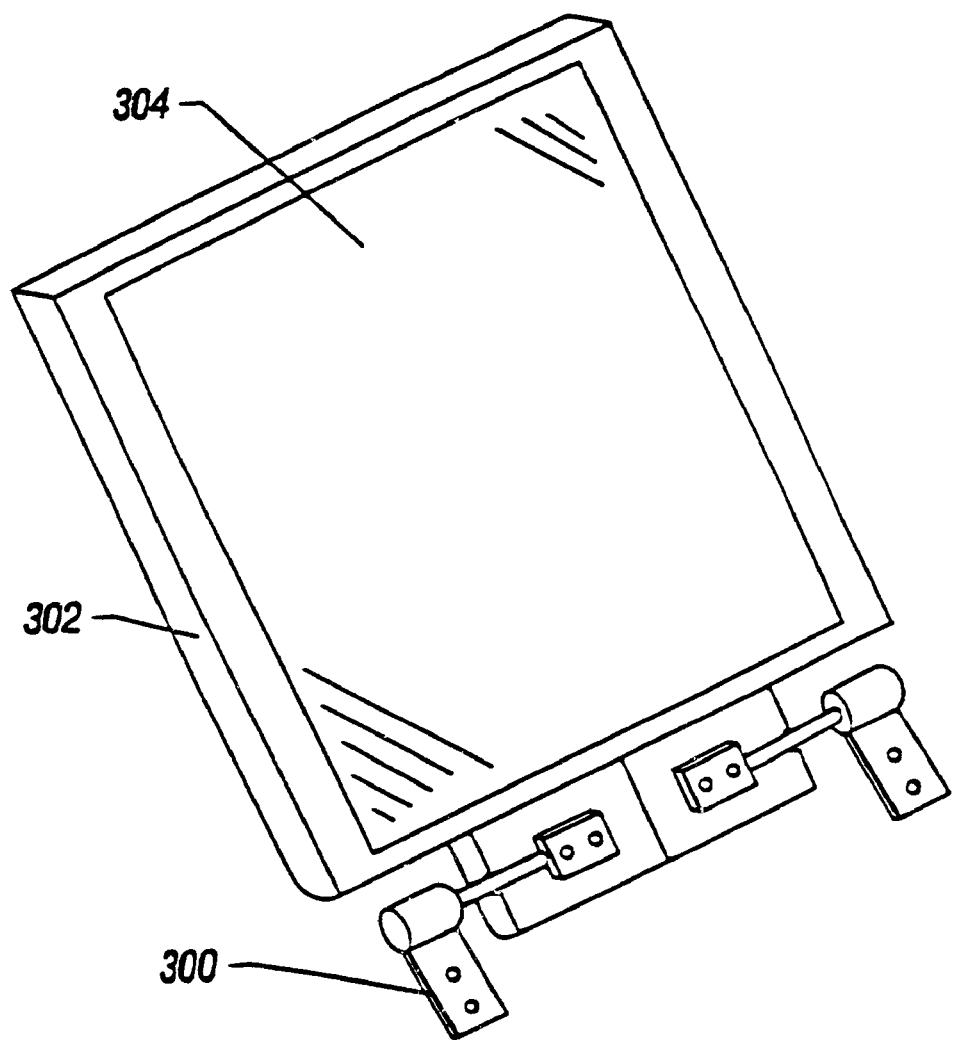
FIG. 3 is a perspective view of a conventional hinge mechanism for portable computers.

In accordance with the invention, a space near the bottom of the display unit 104 that is ordinarily occupied by a hinge assembly and connection wires may be available to accommodate a larger display 106. This arrangement is in contrast to a conventional hinge mechanism 300 that is depicted in FIG. 3 as being attached to a display unit 302. As shown, the hinge mechanism 300 may prevent the display 304 from occupying the lower portion of the display unit 302. Referring again to FIG. 2, by utilizing a planar hinge 108, the display 106 may occupy the area near the bottom of the display unit 104. Accordingly, the display 106 may be 10 to 20 millimeters taller than a typical portable computer display. The additional height of the display 106 may allow for significant improvement in output for the portable computer 100.

Figure 4:
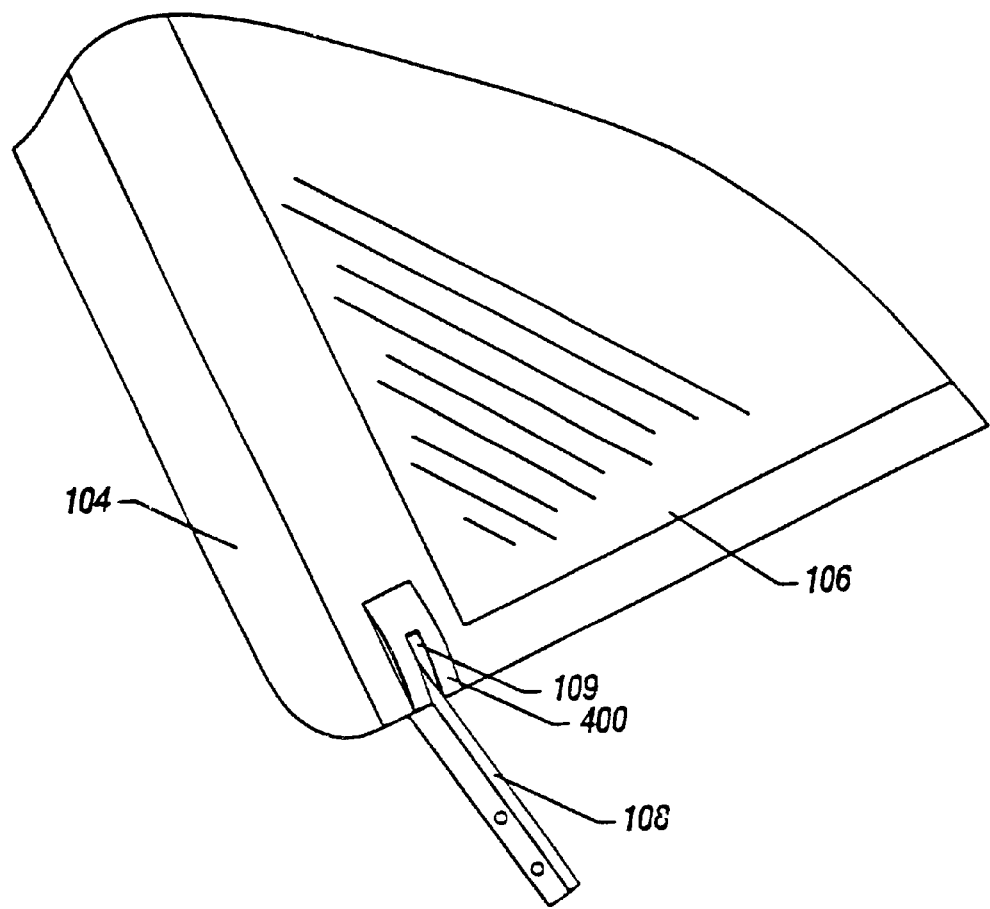
FIG. 4 is a perspective view of a portable computer showing a cover for a planar hinge in accordance with one embodiment of the invention.
Figure 8:
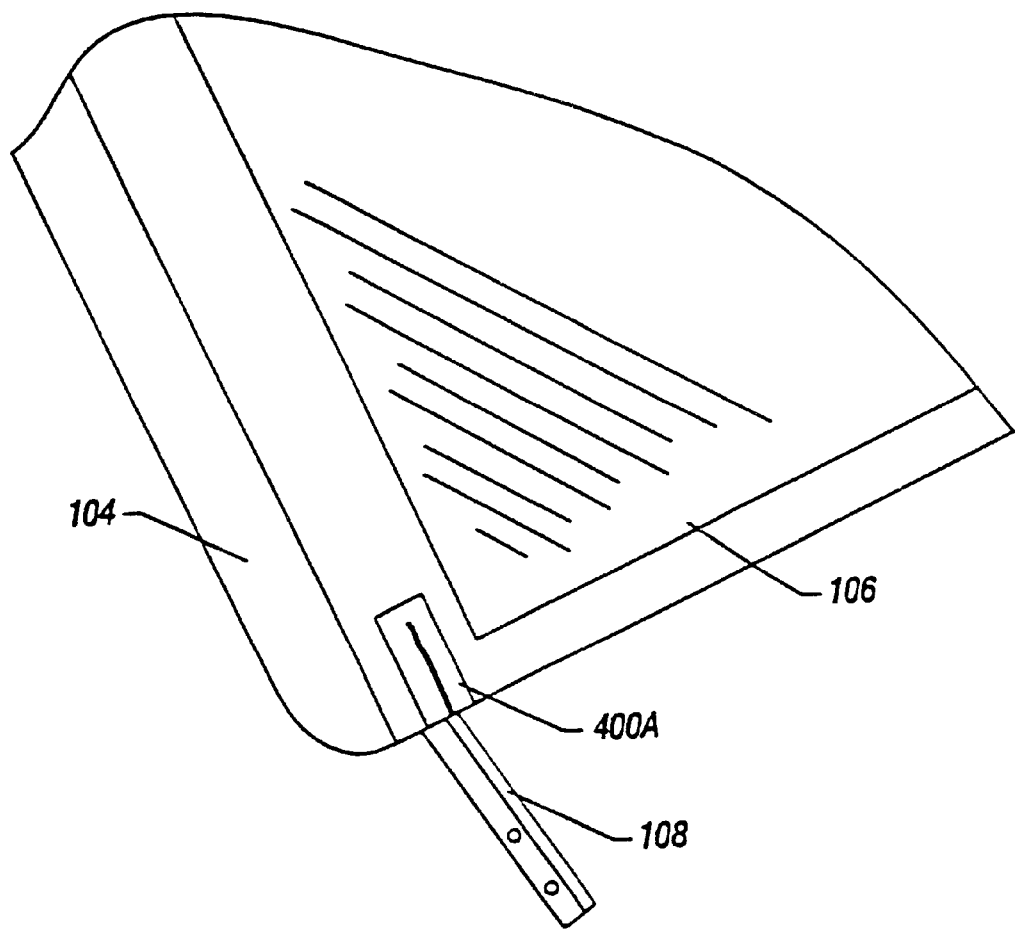
FIGS. 8 and 9 are perspective view of a portable computer showing a blade connection mechanism in accordance with further embodiment of the invention.

In accordance with the invention, the display unit 104 may include a gap in the form of a slot 109 to accommodate rotation of the planar hinge 108. This gap may leave a small portion of the hinge 108 exposed. Referring to FIG. 4, the planar hinge 108 may include a cover 400 to prevent dust or dirt from damaging the hinge 108. In one embodiment, the cover 400 may be a plastic cover including the slot 109 in the middle to allow a member of the hinge 108 to rotate within the slot. In another embodiment, as shown in FIG. 8, a cover 400A may be a two-piece elastic curtain. The two pieces of the curtain may overlap in a center location of the curtain to allow a member of the hinge 106 to rotate through the center of the curtain.

Figure 5:
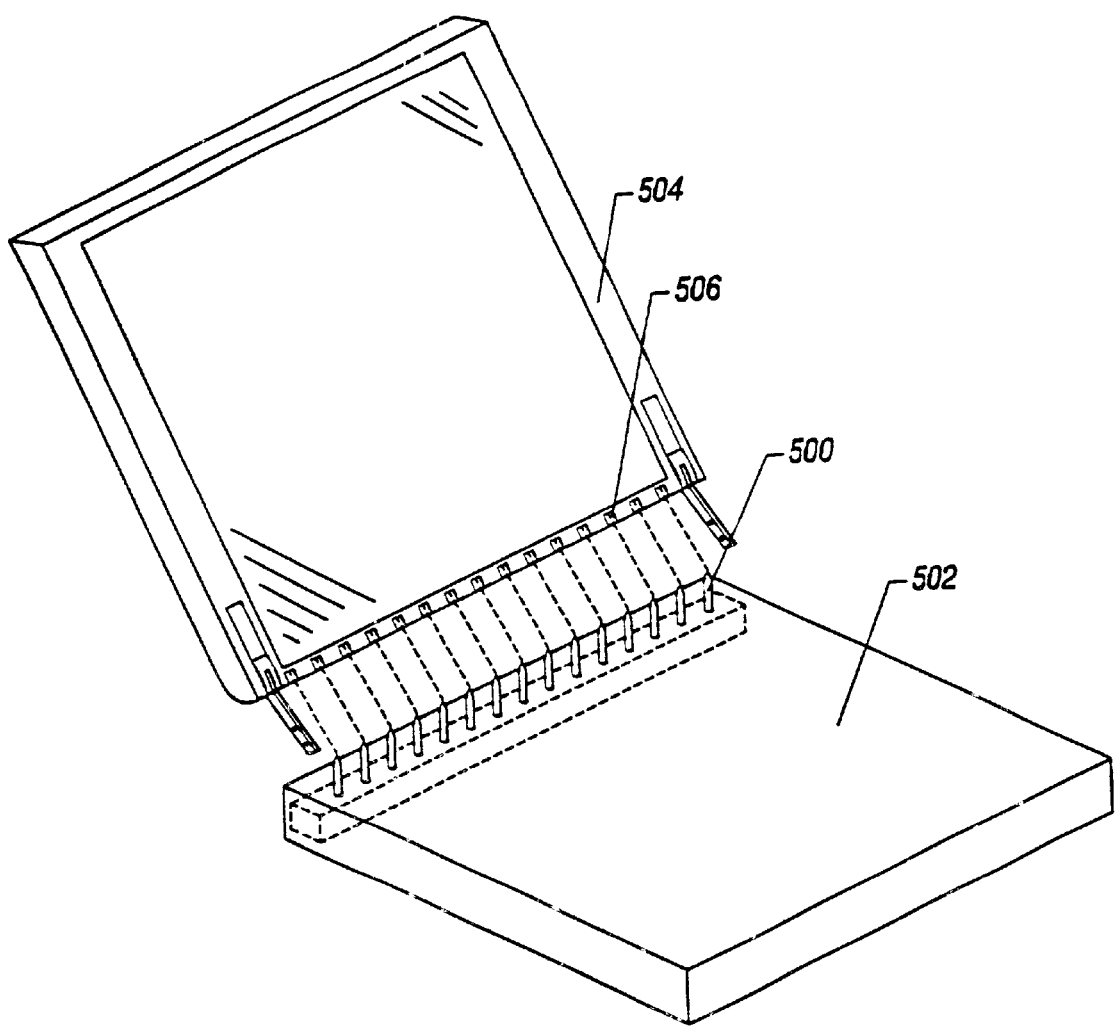
FIG. 5 is a perspective view of a portable computer showing a blade connection mechanism in accordance with one embodiment of the invention.

Conventional portable computers may utilize a hinge assembly to route electrical wires that supply power and output signals to a display. In accordance with the invention, the area near the bottom of the display unit 104 may not be available for routing connection wires. Instead, this area may be occupied by the display 106. Therefore, another mechanism may be employed to supply power and output signals to the display 106. Referring to FIG. 5, a blade connection mechanism may be utilized. In accordance with one embodiment of the invention, blade connectors 500 may be attached to the base unit 502 and protrude upward to connect to the display unit 504. The blade connectors 500 may be thin conducting surfaces made of any conventional conducting material. The display unit 504 may include female connectors 506 to sustain electrical contact with distal ends of the blade connectors 500.

Figure 6:
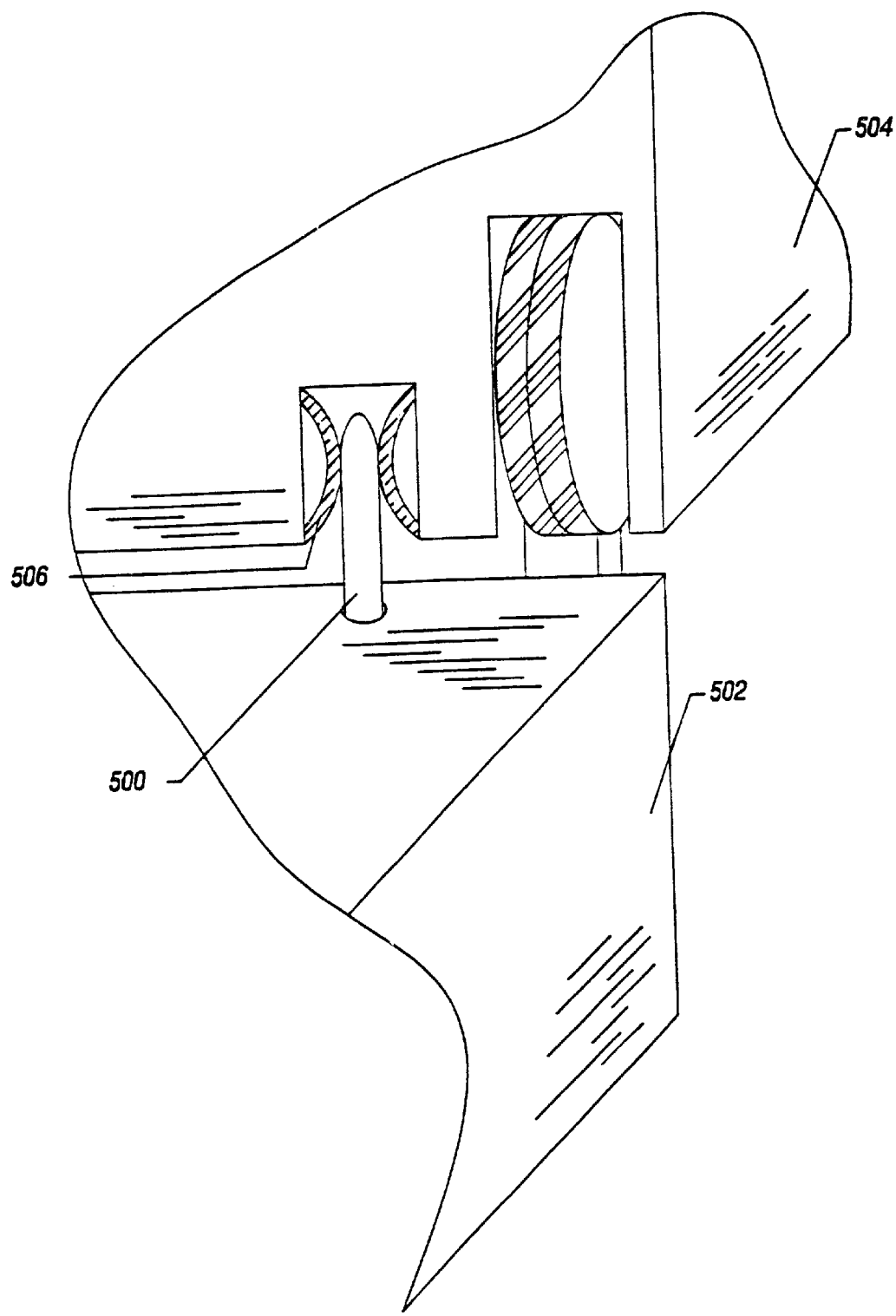
FIG. 6 is a perspective view of a portable computer showing a blade connection mechanism in accordance with another embodiment of the invention.
Figure 7:
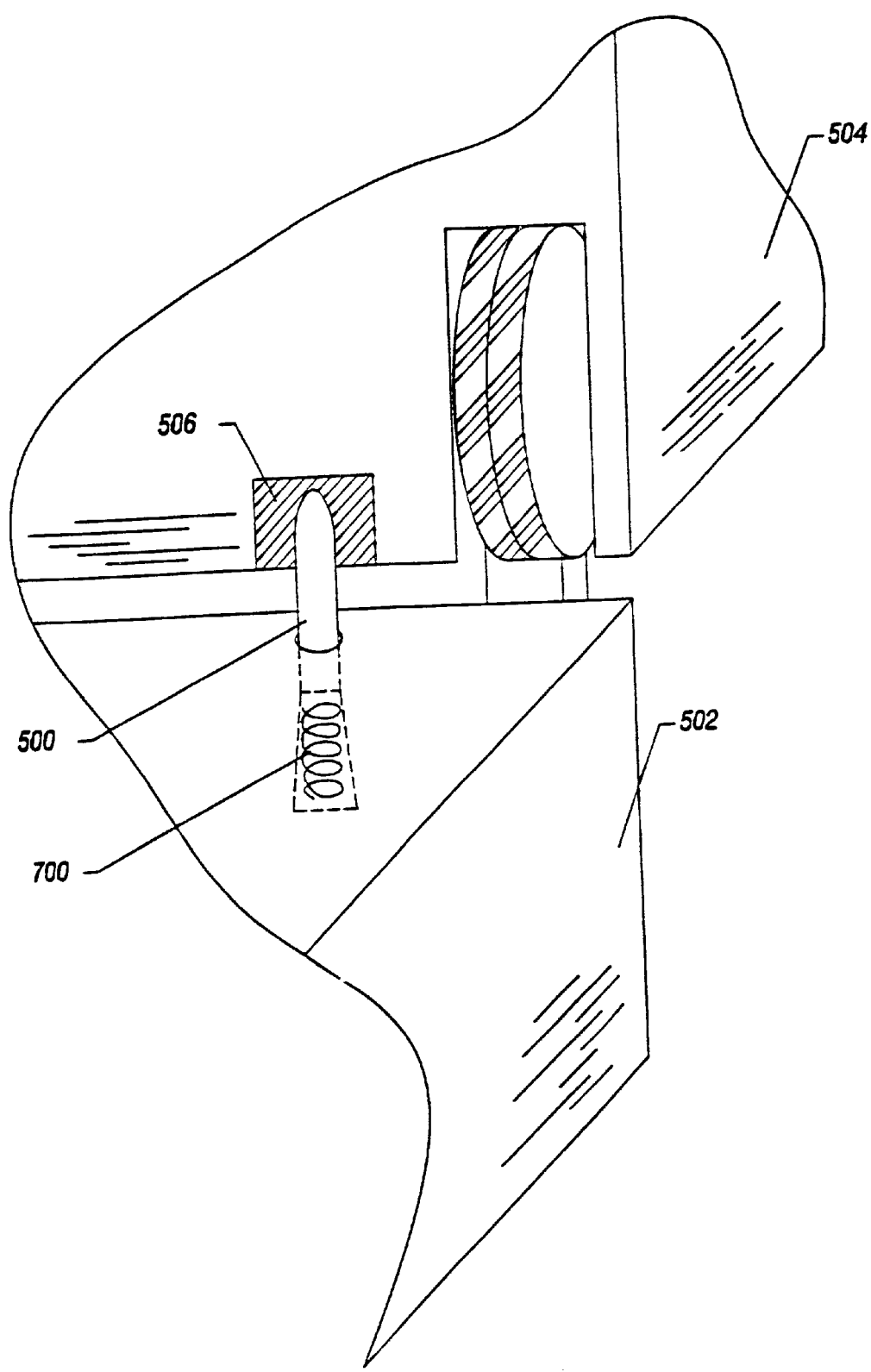
FIG. 7 is a perspective view of a portable computer showing a blade connection mechanism in accordance with yet another embodiment of the invention.

In one embodiment shown in FIG. 6, the female connectors 506 may be two-piece foil connectors into which the blade connectors 500 may be inserted. In another embodiment, the female connectors 506 may be conductive strips with which the blade connectors 500 maintain electrical contact as shown in FIG. 7. In some embodiments, the display unit 504 may not rotate about a fixed axis. Rather, the display unit 504 may rotate around a hinge assembly in an oval socket such that translational movement is allowed in addition to rotational movement. Therefore, the blade connectors 500 may be resilient to maintain contact with the female connectors 506 regardless of the position or rotation of the display unit 504. Accordingly, the blade connectors 500 may be moved up and down during the rotation of the display unit 504 by a spring 700 as shown in FIG. 7.

Figure 9:
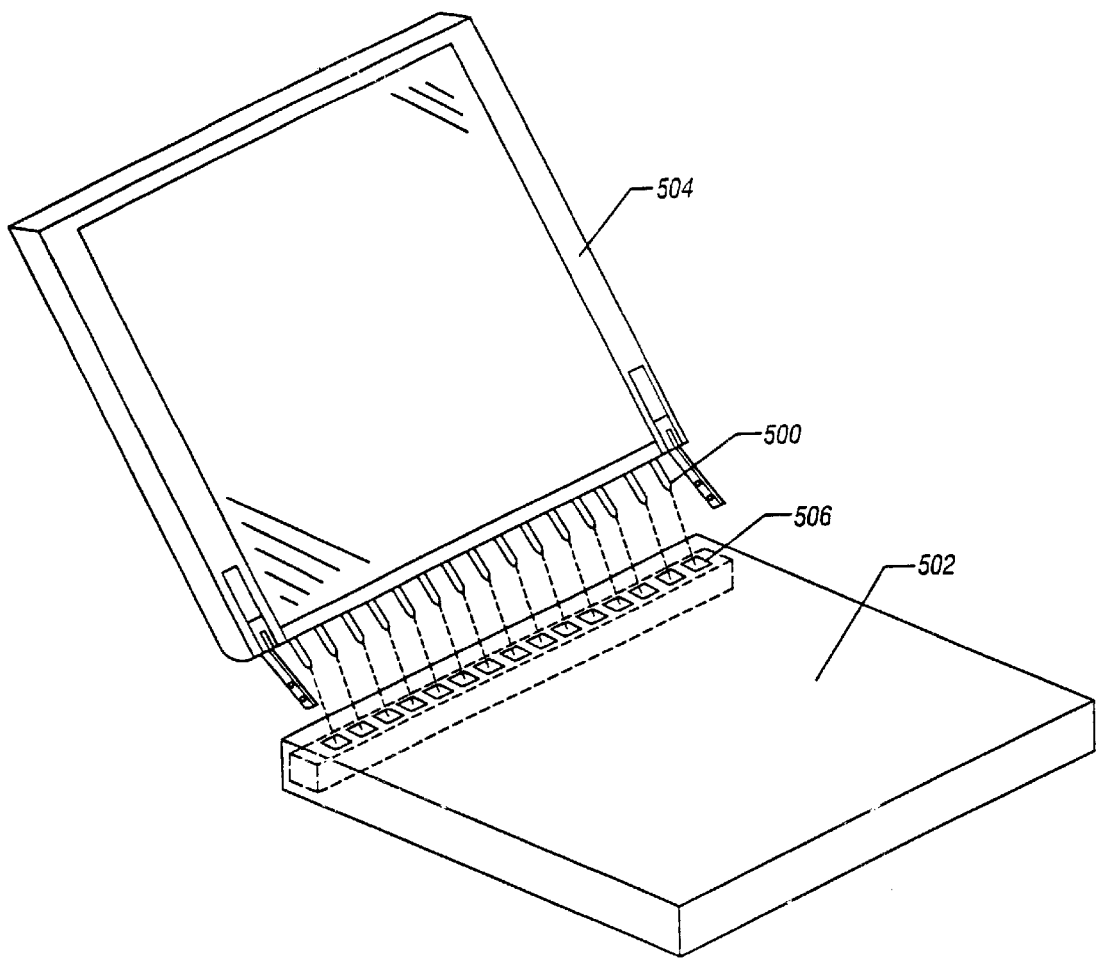

Through a blade connection mechanism, both power and output signals may be conducted from the base unit 502 to the display unit 504. In one embodiment, a single blade connector may conduct a voltage signal to power the display 106 while a second blade connector may act as a ground. In another embodiment, each blade connector may conduct a separate output signal to the display 106. In this embodiment, the number of blade connectors 500 utilized may be correlated to the number of separate output signals generated by the central processing unit 101 of the base unit 102. In accordance with another embodiment, shown on FIG. 9, the female connectors 506 may be located on the base unit 502. In this embodiment, the display unit 504 may include the blade connectors 500 to maintain electrical contact with the female connectors 506. Additionally, a cover for the blade connectors 500 and female connectors 506 may provide insulation and may shield the connectors 500 and 506 from dust and dirt.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A portable computer system comprising:
   a display unit having a display, the display having a first side boundary and a second side boundary, the display unit having a first region outside the first side boundary of the display and a second region outside the second side boundary of the display;
   a base unit; and
   a hinge pivotably coupling the display unit to the base unit, the hinge comprising a generally planar member and a slot adapted to receive the generally planar member, wherein the hinge is mounted to a lower portion of the first region, the hinge having a width less than a width of the first region,
   wherein the slot is defined in one of the display unit and the base unit and the generally planar member is attached to the other one of the display unit and the base unit.

2. The portable computer system of claim 1, wherein the display has a bottom boundary, the hinge staying clear of a region of the display unit below the bottom boundary to provide additional space for the display.

3. The portable computer system of claim 1, further comprising a second hinge having a second generally planar member and a second slot adapted to receive the second generally planar member, the second hinge being mounted to a lower portion of the second region, the second hinge having a width less than a width to the second region.

4. The portable computer system of claim 1, wherein the generally planar member is rotatably received in the slot.

5. The portable computer system of claim 1, wherein the hinge is positioned in the first region between the first side boundary of the display and an outer side edge of the display unit.

6. The portable computer system of claim 1, wherein the generally planar member is a flat member.

7. The portable computer system of claim 6, wherein the flat member has a width less than a width of the first region.

8. A portable computer system comprising:
   a display unit having a display, the display having a first side boundary and a second side boundary, the display unit having a first region outside the first side boundary of the display and a second region outside the second side boundary of the display;
   a base unit;
   a hinge pivotably coupling the display unit to the base unit, the hinge comprising a generally planar member and a slot adapted to receive the generally planar member, wherein the hinge is mounted to a lower portion of the first region, the hinge having a width less than a width of the first region; and
   a blade connector mechanism electrically coupling the display unit to the base unit,
   wherein the blade connector mechanism comprises a female connector coupled to one of the display unit and base unit, and a blade connector coupled to the other one of the display unit and base unit, the female and male connectors adapted to engage each other to provide electrical connection.

9. A portable computer system comprising:

a display unit having a display, the display having a first side boundary and a second side boundary, the display unit having a first region outside the first side boundary of the display and a second region outside the second side boundary of the display;

a base unit;

a hinge pivotably coupling the display unit to the base unit, the hinge comprising a generally planar member and a slot adapted to receive the generally planar member, wherein the hinge is mounted to a lower portion of the first region, the hinge having a width less than a width of the first region; and a blade connector mechanism electrically coupling the display unit to the base unit, wherein the blade connector mechanism comprises a plurality of female connectors coupled to one of the display unit and base unit, and a plurality of blade connectors coupled to the other one of the display unit and base unit, corresponding female and male connectors adapted to engage each other to provide electrical connection.

10. A portable computer system comprising:

a display unit having a display, the display having a side edge;

a base unit; and a hinge pivotably coupling the display unit and the base unit, the hinge comprising a gap, a planar member rotatably received in the gap, and a cover for the gap, wherein the cover comprises a slot to enable rotating movement of the planar member.

11. The portable computer system of claim 10, wherein the display unit has a first region defined between the side edge and an outer side edge of the display unit, the hinge being mounted to a lower portion of the first region, the hinge being positioned in its entirety within a width defined by the first region.

12. The portable computer system of claim 10, wherein the display has a bottom edge and the display unit has a space below the bottom edge of the display, the hinge located outside the space below the bottom edge to provide additional space for the display.

13. A portable computer system, comprising:

a display unit having a display, the display having a first side edge, and the display unit having a first outer side edge;

a base unit; and a hinge pivotably coupling the display unit and the base unit, the hinge attached to a lower portion of the display unit, the hinge being positioned entirely within a width defined between the first side edge of the display and the first outer side edge of the display unit, wherein the hinge comprises a generally planar member and a slot adapted to receive the generally planar member, the slot being defined in one of the display unit and the base unit and the generally planar member defined in the other one of the display unit and base unit.

14. The portable computer system of claim 13, wherein the hinge is attached to a region of the display unit between the first side edge of the display and the first outer side edge of the display unit.

15. The portable computer system of claim 13, wherein the display has a second side edge and the display unit has a second outer side edge, the portable computer system further comprising a second hinge attached to the lower portion of the display unit, the second hinge being positioned entirely between the second side edge of the display and the second outer side edge of the display unit.

16. A method comprising:

providing a display unit having a display, the display having a first side edge and the display unit having a first outer side edge;

providing a base unit;

pivotably attaching the display unit to the base unit with a hinge;

positioning the hinge entirely within a width defined between the first side edge of the display and the first outer side edge of the display unit;

providing the hinge with a generally planar member and a slot to receive the generally planar member; and providing the generally planar member in one of the display unit and base unit and providing the slot in the other one of the display unit and base unit.

17. The method of claim 16, wherein positioning the hinge comprises positioning the hinge outside a lower region of the display unit below a bottom edge of the display to provide more space for the display.

* * * * *